March 14, 1967   J. F. FRÖHLING   3,308,701
FLOATING SHEARS FOR SECTIONING MATERIAL, ESPECIALLY
ROLLING STOCK MATERIAL
Filed June 1, 1965   2 Sheets-Sheet 1
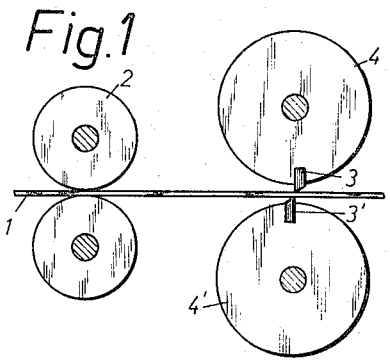
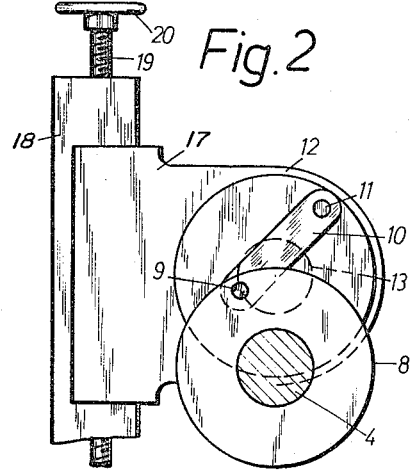
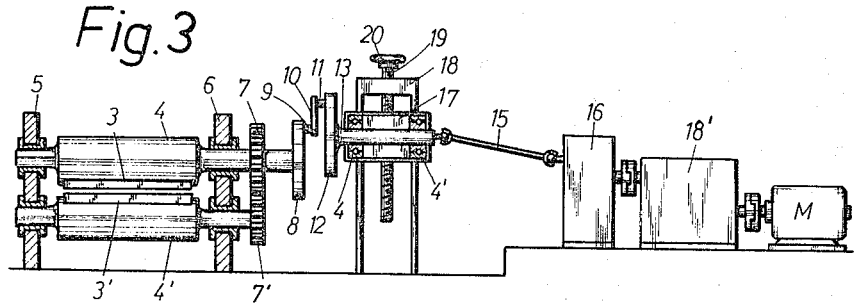
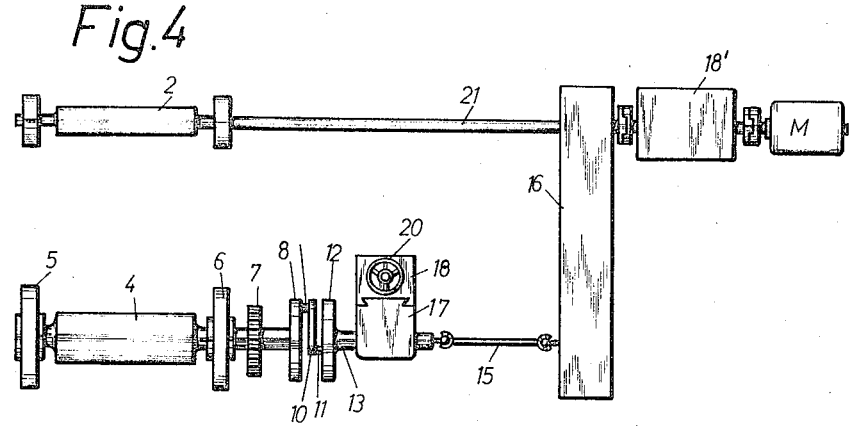

United States Patent Office

3,308,701
Patented Mar. 14, 1967

3,308,701
FLOATING SHEARS FOR SECTIONING MATERIAL, ESPECIALLY ROLLING STOCK MATERIAL
Josef F. Fröhling, Olpe, Westphalia, Germany, assignor to Josef Fröhling, Olpe, Westphalia, Germany, a company
Filed June 1, 1965, Ser. No. 460,070
Claims priority, application Germany, June 4, 1964, F 43,063; Nov. 12, 1964, F 44,423
5 Claims. (Cl. 83—324)

The present invention relates to floating shears for sectioning continuously fed material and includes cylinder shears as well as crank-shears or double crank-shears. For sectioning material as, for instance, material to be rolled, which is in continuous movement, the blades of continuously rotating shears are to carry out a non-uniform rotary movement.

Floating shears of the above-mentioned general type are known in which, for instance, the shearing blades and the blade carriers are connected to cranks which carry out an upward and downward cutting movement and in which it is possible to adjust a movement back and forth in order to be able at the instant of the cut to follow the moving material. The cutting movement effected, for instance, by a crank through the intervention of a lever, has frequently superimposed thereon a horizontal movement of the blades while such superimposing is effected through the intervention of a further crank system and while the magnitude of the movement back and forth is variable in conformity with the speed of the band or other material which is to be sectioned or cut. In this way, the blades describe a path of movement having the shape of a more or less large oval.

The drawback of the above-mentioned known arrangements consists primarily in that, due to the oval path of movement of the blades and the blade levers, inertia forces occur wihch require a limitation of the working speed. Moreover, for purposes of adjusting the magnitude of the horizontal movement of the blades within a crank system, a considerable number of mechanical parts is necessary.

It is, therefore, an object of the present invention to provide floating shears of the above-mentioned general type which will overcome the drawbacks outlined above.

It is another object of this invention to provide floating shears for sectioning continuously fed material such as material to be rolled, which will bring about that the blades at the instant of the cut will, with regard to the transporting direction of the material, move at the same speed as said material.

It is still another object of this invention to provide shears which will make it possible to vary the speed of the cranks bringing about the movement of the blades and will cause the shears to carry out a non-uniform rotary movement.

These and other objects and advantages of the invention will appear more clearly from the following specification in connection with the accompanying drawings, in which:

FIGURE 1 diagrammatically illustrates the principle of a cylinder shear arrangement in side view;

FIGURE 2 is a side view of an adjusting arrangement for the crank discs which may be used in connection with the shears of FIGURE 1;

FIGURE 3 is a diagrammatic view of the total arrangement of cylinder shears with drive therefor;

FIGURE 4 is a top view of FIGURE 3;

Figure 5:
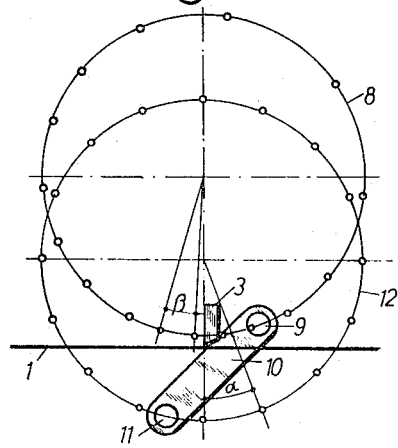
Figure 6:
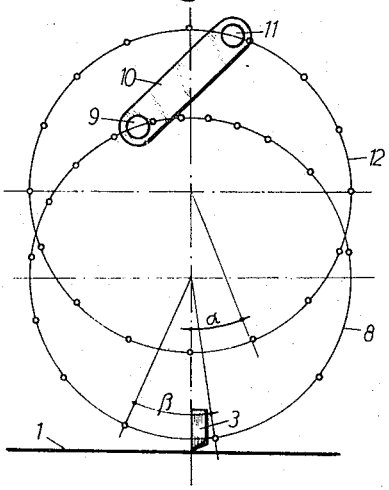
Figure 7:
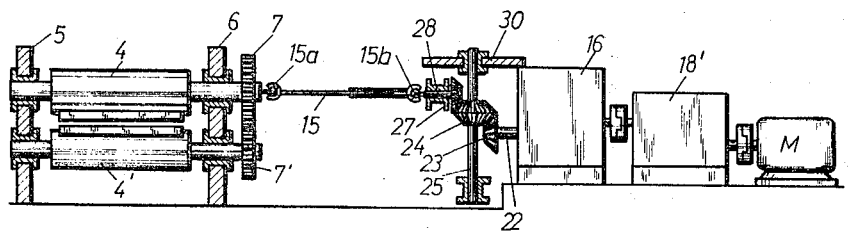
Figure 8:
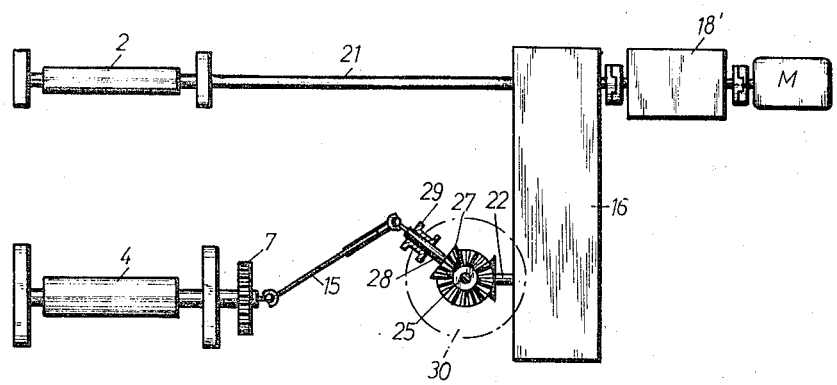

FIGURES 5 and 6 respectively diagrammatically illustrate the blade shaft drive in different positions of the crank discs with regard to each other;

FIGURE 7 is a view similar to that of FIGURE 3 of a modified blade shaft drive;

FIGURE 8 is a top view of the shears of FIGURE 7.

The shears according to the present invention are characterized primarily in that the speed of the blade shafts is by means of a transmission adjustable in conformity with a desired length of the material to be sectioned while simultaneously the blade shafts are subjected to a non-uniform rotary movement which brings about that the blades at the instant of the cut will, with regard to the transporting direction of the material to be sectioned, move at the same speed as the material to be sectioned or cut. Expressed differently, this means that the blades will move along a circular path of movement through a fixed crank system while the blade speed will be variable within said circular path of movement.

Consequently, with crank shears there exists the possibility of controlling the speed of the cranks effecting the movement of the blades and to impart upon the shears a non-uniform rotary movement.

According to one embodiment of the present invention, between the transmission and the blade shafts of a pair of shears, there are provided two cranks or crank discs interconnected through the intervention of bolts and a plate or link, which cranks or crank discs are displaceable relative to each other for purposes of producing a non-uniform rotary movement of the blade shafts while their axes remain parallel to each other.

In order to realize the displacement of the two discs relative to each other and thereby the change in the crank drive, a relatively complicated device is necessary which, in some instances, might be too expensive. Therefore, the present invention also suggests a further embodiment for simplifying the adjustment of the transmission in order to produce the non-uniform movement. To this end, between the transmission and the blade shafts of the shears, there is provided a universal joint shaft which is variable as to its angular position with regard to the driving shaft. A universal joint shaft which is provided with two cross joints and is telescopically extensible in a manner known per se, has the known property that the angular velocity on the output side is, during a revolution of the shaft, non-uniform with regard to the angular velocity of the driving shaft. This non-uniform angular velocity resulting from the construction of the universal joint shaft is taken advantage of in conformity with the present invention in order to impart upon the blade shafts the necessary non-uniform rotary movement.

Referring now to the drawing in detail and FIGS. 1 and 2 thereof in particular, the band-shaped material 1 to be cut is fed to the shears by means of a supplying or straightening machine 2. The shears comprise cutting blades 3 and 3' mounted on blade shafts 4 and 4' respectively. These shafts 4 and 4' are journalled in a superimposed manner in stands 5 and 6 (FIG. 3) and are driven through the intervention of intermeshing gears 7 and 7'. Gears 7 and 7' assure a precise synchronism of shafts 4 and 4'. Gear 7 keyed to the upper blade shaft 4 is the driven gear in conformity with the specific showing in the drawing.

When the blades at the instant of a cut have the same velocity as the material passing therebetween, a cutoff band section or sheet metal piece will have the length of the circumference of a circular path described by a blade, which means a fixed length. This length is to be variable by varying the drive.

FIGS. 3 and 4 show that at the end of the blade shaft 4 having gear 7 keyed thereto there is provided a disc or crank 8 which has an eccentrically arranged bolt 9 on which a plate or link 10 is rotatably mounted. The other end of link 10 is linked to a bolt 11 which is eccentrically connected to a second crank disc 12. This second crank disc 12 is arranged at the end of a driven shaft 13 which is journalled in bearings 14 and 14' arranged in a support or bracket 17. Shaft 13, is through the intervention of a universal joint, shaft 15 or another suitable transmission connected to a transmission 16 which drives shaft 13.

Support 17 which supports bearings 14 and 14' is vertically displaceable in guiding means of a stand 18. This vertical displaceability is effected by means of a spindle 19 and a hand-wheel 20. Shaft 13 is thus displaceable relative to blade shaft 4 while, however, the axis-parallelity between blade shaft and driven shaft 13 remains maintained. By means of this displacement of the two discs 8 and 12 with regard to each other, it will be assured that with uniform rotary movement of disc 12, disc 8 mounted on blade shaft 4 will be subjected to a non-uniform rotary movement of an adjustable magnitude.

FIG. 5 diagrammatically illustrates a position of discs 8 and 12 relative to each other while disc 12, in conformity with the uniform rotary movement imposed thereupon, is divided into sixteen angles or angular sections of substantially identical magnitude. These individual sections are indicated in the drawing by small circles of nearly point-like size, said small circles being located on the peripheral line of the discs. These rotary angles are passed through by bolt 11. Through the intervention of link 10 and bolts 9, the said uniform rotary movement of disc 12 is conveyed to disc 8 in such a manner that the latter will be subjected to a non-uniform rotation. The peripheral line of disc 8 has indicated thereon corresponding non-uniform angles of rotation, likewise by small circles.

As will be evident from the drawing, angle $\beta$ passed through by disc 8 is in the illustrated example about half the size of angle $\alpha$ passed through during the same time by disc 12. This means that at the instant of the cut, the blades will move at a lower speed than the drive of shaft 13.

If the speed of shaft 13 or disc 12 were adjusted by varying the transmission 16 so as to be twice as high, the speed of the blades in the transporting direction of the material would equal the feeding speed of the material to the shears. In such an instance, the blades would pass through their path of movement in half the time as during a uniform movement, so that the cut-off sections would be half as long as during the adjustment of discs 8 and 12 relative to each other in such a way that their axes are in alignment with each other.

FIG. 6 shows a different adjustment of discs 8 and 12 with regard to each other. In conformity with this adjustment, disc 8 will at the instant of the cut pass through an angle of rotation which is approximately twice the angle of rotation of disc 12. When reducing the speed of disc 12 by changing the transmission 16, it will be appreciated that at the same transporting speed of the material, the length of the cutoff sections will be twice as great as when the discs 8 and 12 have the same axis.

Further adjusting possibilities, in addition to those discussed in connection with FIGS. 5 and 6, are, of course, possible. Also, the illustrated example for the control ratio of approximately 1:4 may be increased.

The shears are driven by a motor M (FIG. 3) which, through the intervention of a transmission 18' drives the straightening or driving machine 2 as well as the blade shafts 4 and 4'. Driving or straightening machine 2 will impart upon the material to be sectioned a speed corresponding to the drive of said driving or straightening machine. The transmission 18' is followed by a transmission 16 which in its turn drives on one hand the universal joint 15, and on the other hand a shaft 21 for driving the straightening machine 2 (FIG. 4).

The ratio of the moving speed of the material to be sectioned—which ratio is adjusted in transmission 16—with regard to the speed of the blade shaft will, in conformity with the position of discs 8 and 12 relative to each other, determine the adjustment of the desired length of the material.

In order to obtain a liner variation of the non-uniformity of the movement of the blade shafts, it is not under all circumstances necessary that support 17 be guided by straight guiding means in stand 18, as illustrated in the drawing, but support 17 may also be displaceable along a curved path, for instance on a link or along a cam.

According to a further embodiment of the present invention, the drive shaft connected to the universal joint may, through the intervention of bevel gears, be tiltable radially whereby the angular position of the universal joint shaft is variable. This drive shaft may, for instance, be journalled on a support which is tiltable about an intermediate shaft, the arrangement being such that the bevel gear connected to the output shaft is adapted to roll on a bevel gear connected to the intermediate shaft.

More specifically, with reference to FIGS. 7 and 8, the universal joint shaft 15 which is variable as to its length is directly connected to the upper blade shaft 4 which carries pinion 7. Shaft 15 has two cross joints 15 and 15a, cross joint 15a serving for connection with blade shaft 4.

The shears of this embodiment are driven by a motor M through a transmission 18' and a transmission 16 which at the same time, through the intervention of shaft 21, also drives the driving or straightening machine 2. The second output shaft 22 of transmission 16 includes a bevel gear 23 meshing with a bevel gear 24 which is mounted on a vertically arranged intermediate shaft 25. Intermediate shaft 25 has connected thereto a further bevel gear 26 meshing with a bevel gear 27 which is keyed to a drive shaft 28 for universal shaft 15. Bearing 29 of shaft 28 is arranged on a support 30 which is pivotable about the vertically arranged shaft 25.

However, as will be evident in particular from FIG. 8, a pivoting of support 30 brings about a change in the angular position of universal shaft 15 relative to drive shaft 28 or blade shaft 4. In this way, it is possible to vary the angular velocity of the blade shafts relative to the driving speed of shaft 28. There will thus, by very simple means, be realized the necessary non-uniform rotary movement of blade shafts 4 and 4' so that at the instant of a cut, the blades will have the same speed as the feed of the material to be cut.

It is, of course, to be understood, that the present invention is, by no means, limited to the particular arrangements shown in the drawings, but also comprises any modifications within the scope of the appended claims. Thus, also shears with crank drives and levers, for instance two-crank shears, four-crank shears, or similar devices may be equipped with the drive according to the present invention, with the effect outlined above.

If the control ratio possible with the arrangement of the present invention should not be sufficient, it is possible after each cutting movement, by suitable devices to skip the next cut so that the material will be cut to twice the adjusted length.

What I claim is:

1. Floating shears for sectioning material, especially rolling stock material, which include: a pair of rotatable shafts provided with cutting blades for receiving therebetween the material to be sectioned, motor means, transmission means drivingly connected to said motor means, two crank disc means respectively drivingly conected to one of said shafts and to said transmission means, said disc means having their axes of rotation substantially parallel but offset with regard to each other, link means pivotally connected to both of said crank disc means and drivingly interconnecting the same, and means operable to adjust said two crank disc means relative to each other while maintaining their axes of rotation substantially parallel to each other.

2. Floating shears for sectioning material, especially rolling stock material, which includes: two rotatable cutting members operable to section material received therebetween, driving means, transmission means drivingly connected to said driving means, and universal joint shaft means interposed between and drivingly interconnecting said cutting members and said transmission means, said universal joint shaft means being adjustable relative to said cutting members to vary the angle confined by said universal joint shaft means with the axis of rotation of the respective adjacent cutting member.

3. Floating shears for sectioning material, especially rolling stock material, which includes: two rotatable cutting members operable to section material received therebetween, driving means, transmission means drivingly connected to said driving means, and universal joint shaft means variable in length and having one end portion rotatably connected to said transmission means, said other end portion being adjustable along a circular path for selectively varying the angle confined by said universal joint shaft means with the axis of rotation of that cutting member which is rotatably connected to the first mentioned end portion of said universal shaft means.

4. An arrangement according to claim 3, in which said transmission means includes bevel gear means drivingly connected to said other end portion of said universal joint shaft means so as to permit radial adjustment of said other end portion relative to said bevel gear means.

5. Floating shears for sectioning material, especially rolling stock material, which includes: two rotatable cutting members operable to section material received therebetween, driving means, transmission means drivingly connected to said driving means, universal joint shaft means having one end portion drivingly connected to one of said cutting members, said transmission means including first bevel gear means rotatable about an axis extending substantially at a right angle with regard to the longitudinal extension of said one cutting member, said transmission means also including an auxiliary shaft having one end portion connected to the other end portion of said universal joint shaft means, and second bevel gear means connected to the other end portion of said auxiliary shaft and meshing with said first bevel gear means while being movable about the axis of rotation of said first bevel gear means.

References Cited by the Examiner
UNITED STATES PATENTS

| | | | |
|---|---|---|---|
| 2,204,067 | 6/1940 | Brinker | 83—324 |
| 2,262,971 | 11/1941 | Sieg | 83—324 |
| 2,289,394 | 7/1942 | Ungar | 83—324 |
| 3,176,565 | 4/1965 | Shields | 83—324 |

WILLIAM W. DYER, JR., *Primary Examiner.*

JAMES M. MEISTER, L. B. TAYLOR,
*Assistant Examiners.*